G. W. MOORE.
OIL BURNER.
APPLICATION FILED MAY 3, 1909.
938,428.
Patented Oct. 26, 1909.
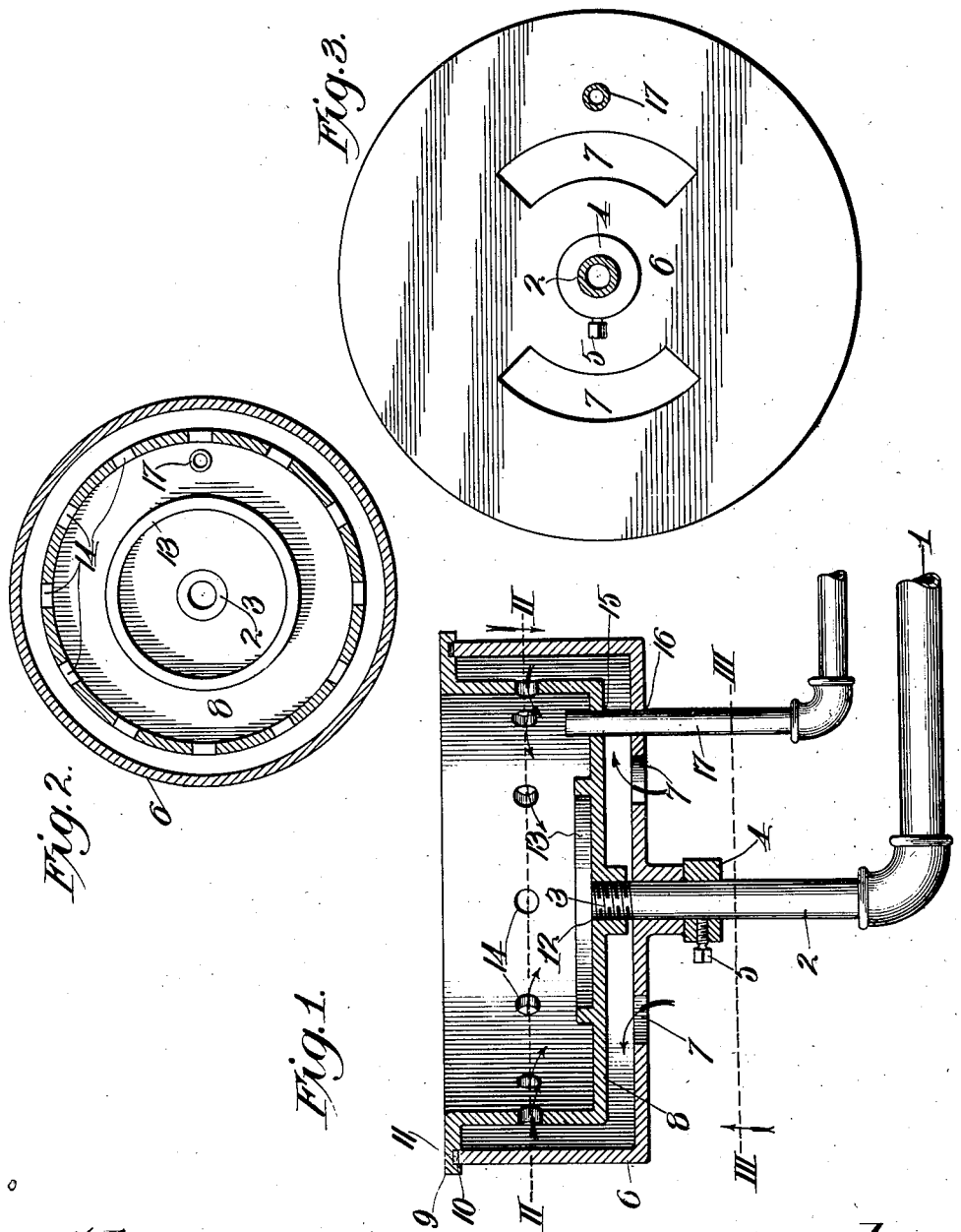
Witnesses
Frank R. Howe
H. C. Rodgers.
Inventor
G. W. Moore
By George G. Thorpe Atty.

UNITED STATES PATENT OFFICE.

GEORGE W. MOORE, OF PARSONS, KANSAS.

OIL-BURNER.

938,428.

Specification of Letters Patent.

Patented Oct. 26, 1909.

Application filed May 3, 1909. Serial No. 493,629.

*To all whom it may concern:*

Be it known that I, GEORGE W. MOORE, a citizen of the United States, residing at Parsons, in the county of Labette and State of Kansas, have invented certain new and useful Improvements in Oil-Burners, of which the following is a specification.

This invention relates to oil burners and more especially to burners in which crude oil may be used, and my object is to produce an efficient and reliable burner of this character of simple, strong, durable and cheap construction.

With this object in view the invention consists in certain novel and peculiar features of construction and organization as hereinafter described and claimed; and in order that it may be fully understood reference is to be had to the accompanying drawing, in which:—

Figure 1, represents a central vertical section of a burner embodying my invention. Fig. 2, is a horizontal section of the burner on a reduced scale, taken on the line II—II of Fig. 1. Fig. 3, is an inverted section of the burner taken on the line III—III of Fig. 1.

In the said drawing, 1 indicates an oil-supply pipe leading from a suitable elevated tank or reservoir, not shown, and terminating in an upwardly-projecting pipe 2 externally threaded at its upper end by preference at 3.

4 is a collar secured by a set-screw 5 on pipe 2 of the supply-pipe and fitting on pipe 2 and resting upon the collar is a cylindrical casing or shell 6 provided in its bottom with a pair of preferably arcuate slots or openings 7.

8 is a circular pan of smaller diameter and depth than and fitting concentrically within the casing or shell 6 and provided with an outwardly-projecting flange 9 equipped with a groove 10 to receive the upper end of casing or shell 6 and a gasket 11 of asbestos or other fireproof material so as to establish a substantially air-tight joint between the upper edge of the casing or shell 6 and flange 9.

The pan is provided with a threaded opening 12 to receive the threaded upper end 3 of pipe 2 and with an upwardly-projecting wall 13 surrounding said opening and forming an oil chamber. The wall of pan 8 is also provided with a series of air-holes 14 communicating with the space or chamber between said pan and the casing or shell 6, and with an opening 15 in its bottom registering with an opening 16 in the bottom of the casing or shell, through which openings, 15 and 16, extends a drain pipe 17, the upper of the same terminating by preference, above the top of wall 13.

The burner may be of any other configuration than that shown and of any other size or proportion to accommodate the combustion chamber of the stove or furnace in which it is to be used, it being understood, that like burners of this type, all of the air to support combustion is adapted to pass up through slots or openings 7 into the space or chamber between the casing or shell and the pan so as to be heated by contact with the latter and then pass into the pan through the air-holes 14 as indicated by the arrows.

In practice a small quantity of oil, crude oil or any other kind, is first supplied to the chamber formed within the pan by wall 13, and a torch or ignited taper is inserted in the pan to ignite such oil in order that the pan may be preliminarily heated to a vaporizing temperature. When this is accomplished the oil is permitted to flow through pipes 1 and 2 into the heated oil chamber, where it vaporizes and ignites, and is fed by the hot air supplied as hereinbefore explained and as indicated by the arrows. The supply of hot air continues as long as the burner is in operation and insures a thorough and substantially perfect combustion to the end that all of the constituents of the oil shall be consumed and no material coking or incrustation of unconsumed asphaltum, shall accumulate in the pan or its central chamber and require frequent chiseling to extract it. Should unconsumed oil accumulate in the pan in sufficient quantity to overflow the upper end of the drain-pipe, the surplus flows off through the latter and thus is avoided any possibility of oil escaping through the air-holes and eventually through slots or openings 7 onto the bottom of the stove or furnace containing the burner. When necessary to clean the pan the drain-pipe is first withdrawn and then the pan is unscrewed from pipe 2 after which casing or shell 6 may be lifted off the end of said pipe.

From the above description it will be apparent that I have produced an oil burner embodying the desirable features enumerated in the statement of the object of the invention and which is susceptible of modification in minor particulars without departing from the principle of construction involved.

Having thus described the invention what I claim as new and desire to secure by Letters-Patent, is;

An oil burner, comprising an oil-supply pipe, terminating in an upwardly-projecting pipe threaded at its upper end, a collar mounted on the upwardly-projecting pipe, a casing fitting on said pipe and said collar and provided with an opening in its bottom, a pan fitting within and spaced from the casing and screwed upon the threaded end of said pipe and provided with a wall projecting upward from the bottom around said pipe, a series of air-holes above said wall and an outwardly-projecting flange overlying the casing and provided with a groove receiving the upper edge of the latter, a gasket fitting in said groove and engaging said edge, and a drain pipe extending through the casing and into the pan.

In testimony whereof I affix my signature, in the presence of two witnesses.

GEORGE W. MOORE

Witnesses:
M. A. O'DONNELL,
G. Y. THORPE.